US008619613B2

(12) United States Patent
Vujcic

(10) Patent No.: US 8,619,613 B2
(45) Date of Patent: Dec. 31, 2013

(54) RANDOM ACCESS RESOURCE CONFIGURATION

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 53 days.

(21) Appl. No.: 13/147,589

(22) PCT Filed: Nov. 20, 2009

(86) PCT No.: PCT/KR2009/006848
§ 371 (c)(1),
(2), (4) Date: Sep. 27, 2011

(87) PCT Pub. No.: WO2010/087571
PCT Pub. Date: Aug. 5, 2010

(65) Prior Publication Data
US 2012/0008575 A1    Jan. 12, 2012

Related U.S. Application Data

(60) Provisional application No. 61/159,060, filed on Mar. 10, 2009, provisional application No. 61/149,335, filed on Feb. 2, 2009.

(51) Int. Cl.
*G08C 15/00*  (2006.01)
*H04W 4/00*  (2009.01)
*H04B 7/208*  (2006.01)

(52) U.S. Cl.
USPC ............ 370/252; 370/330; 370/344; 370/478

(58) Field of Classification Search
USPC ....................................................... 370/329
See application file for complete search history.

(56) References Cited

U.S. PATENT DOCUMENTS

| 6,574,212 | B1 | 6/2003 | Halton et al. |
| 2005/0186959 | A1 | 8/2005 | Vialen et al. |
| 2007/0047513 | A1* | 3/2007 | Anderson ..................... 370/345 |
| 2007/0064669 | A1* | 3/2007 | Classon et al. ................ 370/347 |

(Continued)

FOREIGN PATENT DOCUMENTS

| EP | 2015594 | 1/2009 |
| WO | 2008/042889 | 4/2008 |
| WO | 2008/050961 | 5/2008 |
| WO | 2008/050996 | 5/2008 |

OTHER PUBLICATIONS

ZTE, "Initial Uplink Access Procedure in LTE-Advanced", R1-090076, 3GPP TSG RAN WG1 Meeting #55bis, Jan. 2009, XP-050318020.

(Continued)

*Primary Examiner* — Chirag Shah
*Assistant Examiner* — Ashley Shivers
(74) *Attorney, Agent, or Firm* — Lee, Hong, Degerman, Kang & Waimey

(57) ABSTRACT

The invention relates to a method of configuration of random access resources in the case of carrier aggregation wherein one or more uplink and downlink component carriers can be configured by the network, the method comprising the resolution of carrier ambiguity in case of downlink and uplink asymmetric component carrier (CC) configuration by allowing the network to determine on which downlink component carrier the UE camps on. The invention further relates to a method of random access and a network entity and a user equipment for implementing the methods.

6 Claims, 7 Drawing Sheets

(56) References Cited

U.S. PATENT DOCUMENTS

Figure 1:
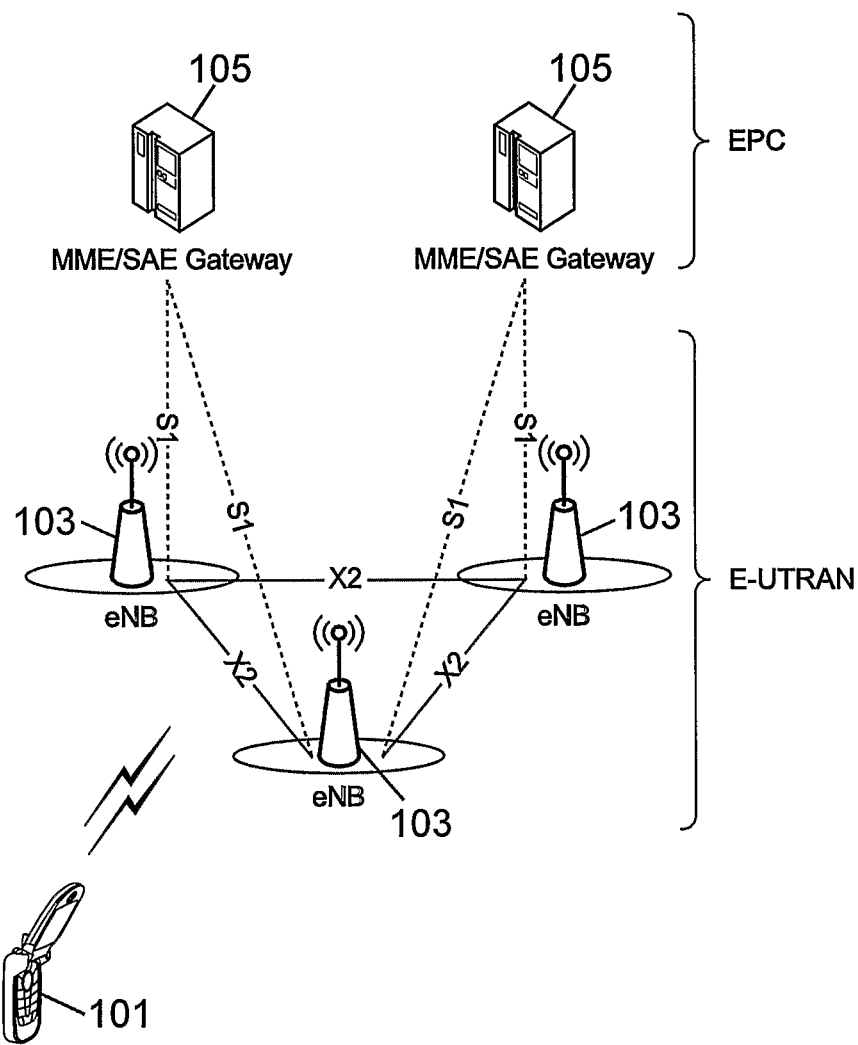

| | | |
|---|---|---|
| 2007/0097909 A1 | 5/2007 | Khandekar et al. |
| 2007/0147310 A1 | 6/2007 | Cai |
| 2007/0147326 A1 | 6/2007 | Chen |
| 2007/0264936 A1* | 11/2007 | Kim et al. .................. 455/45 |
| 2008/0043671 A1 | 2/2008 | Moon et al. |
| 2008/0043771 A1 | 2/2008 | Cho et al. |
| 2008/0096563 A1 | 4/2008 | Fischer et al. |
| 2008/0101305 A1 | 5/2008 | Cave et al. |
| 2008/0139214 A1 | 6/2008 | Sun et al. |
| 2008/0225785 A1 | 9/2008 | Wang et al. |
| 2008/0232283 A1 | 9/2008 | Jen |
| 2008/0267126 A1 | 10/2008 | Vujcic et al. |
| 2008/0267161 A1* | 10/2008 | Bertrand et al. .............. 370/347 |
| 2008/0316961 A1 | 12/2008 | Bertrand et al. |
| 2009/0011717 A1 | 1/2009 | Iwasaki |
| 2009/0011769 A1 | 1/2009 | Park et al. |
| 2009/0239545 A1* | 9/2009 | Lee et al. ................... 455/450 |
| 2010/0110994 A1* | 5/2010 | Ratsuk et al. ................. 370/329 |
| 2010/0260079 A1* | 10/2010 | Baldemair et al. ............ 370/280 |
| 2010/0265854 A1* | 10/2010 | Baldemair et al. ............ 370/280 |
| 2011/0111785 A1* | 5/2011 | Lindoff et al. ............... 455/513 |

OTHER PUBLICATIONS

Texas Instruments, "RACH Procedure for Asymmetric Carrier Aggregation", R1-090284, 3GPP TSG RAN WG1 #55bis, Jan. 2008, XP-050318208.

LG Electronics, "Initial Access Procedure in LTE-Advanced", R1-090210, 3GPP TSG RAN WG1 Meeting #55bis, Jan. 2009, XP-050318141.

NTT DOCOMO, "Initial Access Procedure for Asymmetric Wider Bandwidth in LTE-Advanced", R1-084249, 3GPP TSG RAN WG1 Meeting #55, Nov. 2008, XP-050317534.

Samsung Electronics, "Initial random access in asymmetric carrier aggregation", R1-090093, 3GPP TSG RAN WG1 Meeting #55bis, Jan. 2009, XP-050318036.

3rd Generation Partnership Project (3GPP), "Technical Specification Group Radio Access Network; Evolved Universal Terrestrial Radio Access (E-UTRA) Medium Access Control (MAC) protocol specification (Release 8)", 3GPP TS 36.321 V 8.4.0, Dec. 2008, XP-050377620.

LG Electronics, "Resolving downlink carrier amiguity with RACH", R1-090780, 3GPP TSG RAN WG1 #56, Feb. 2009, XP-050318638.

3rd Generation Partnership Project (3GPP), "Technical Specification Group Radio Access Network; Evolved Universal Terrestrial Radio Access (E-UTRA) Medium Access Control (MAC) protocol specification (Release 8)", 3GPP TS 36.321 V 8.3.0, Sep. 2008, XP-050377620.

Parkvall, et al., "LTE-Advanced-Evolving LTE Towards IMT-Advanced", IEEE, Mar. 2008, 5 pages.

United States Patent and Trademark Office U.S. Appl. No. 13/147,358, Office Action dated Jan. 31, 2013, 15 pages.

United States Patent and Trademark Office U.S. Appl. No. 13/147,358, Final Office Action dated Sep. 17, 2013, 24 pages.

* cited by examiner

RANDOM ACCESS RESOURCE CONFIGURATION

CROSS-REFERENCE TO RELATED APPLICATIONS

This application is a 371 U.S. national stage application of International Application No. PCT/KR2009/006848, filed on Nov. 20, 2009, which claims priority to U.S. Provisional Application Ser. Nos. 61/159,060, filed on Mar. 10, 2009 and 61/149,335, filed on Feb. 2, 2009, the contents of which are incorporated by reference herein in their entirety.

FIELD OF THE INVENTION

The present invention relates to a random access channel (RACH) procedure in a cellular communications network, and in particular to a method and apparatus for configuring random access resources. While it is described below in the context of a long term evolution (LTE) and LTE-A (long term evolution advanced) type cellular network for illustrative purposes and since it happens to be well suited to that context, those skilled in the art will recognise that the invention disclosed herein can also be applied to various other types of cellular networks.

DISCUSSION OF THE RELATED ART

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

FIG. 1 is a block diagram illustrating a network structure of an evolved universal terrestrial radio access system (E-UTRA). The E-UTRA may be also referred to as an LTE system. The communication network is widely deployed to provide a variety of communication services such as voice and packet data.

As illustrated in FIG. 1, the E-UTRA network includes an evolved UMTS terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

Figure 2A:
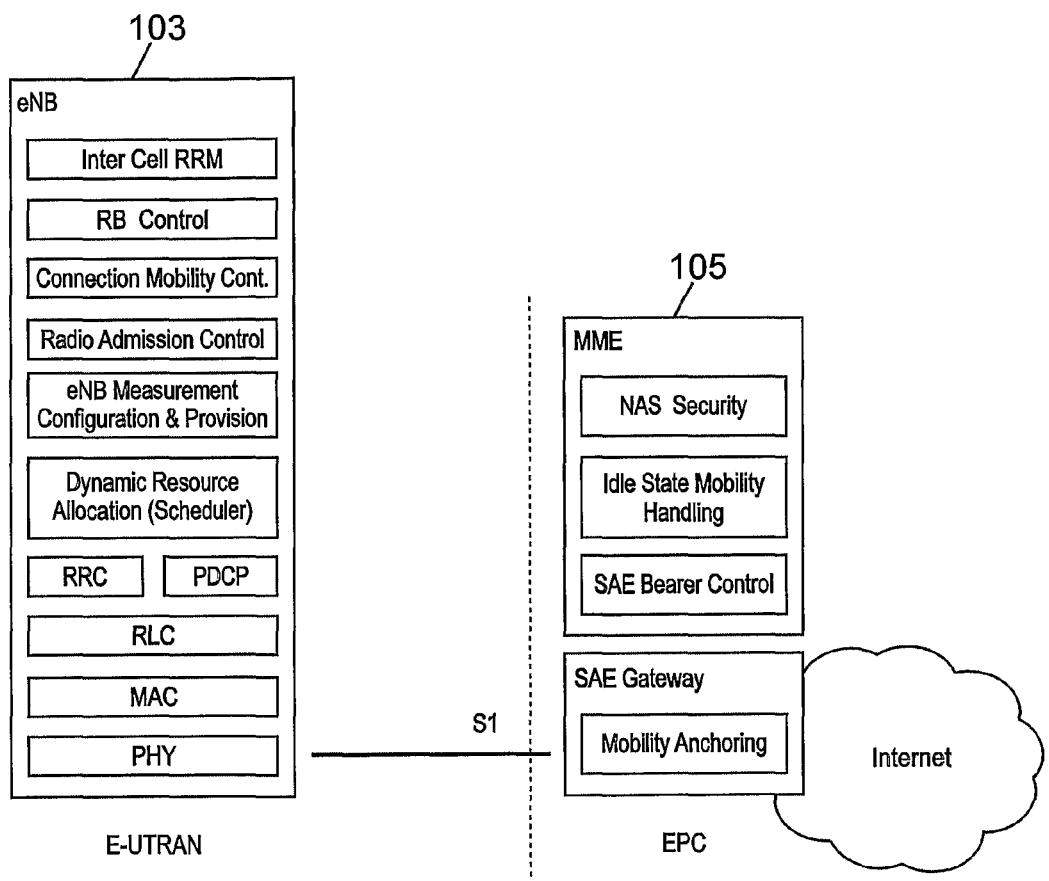

FIG. 2(a) is a block diagram depicting architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

Figure 2B:
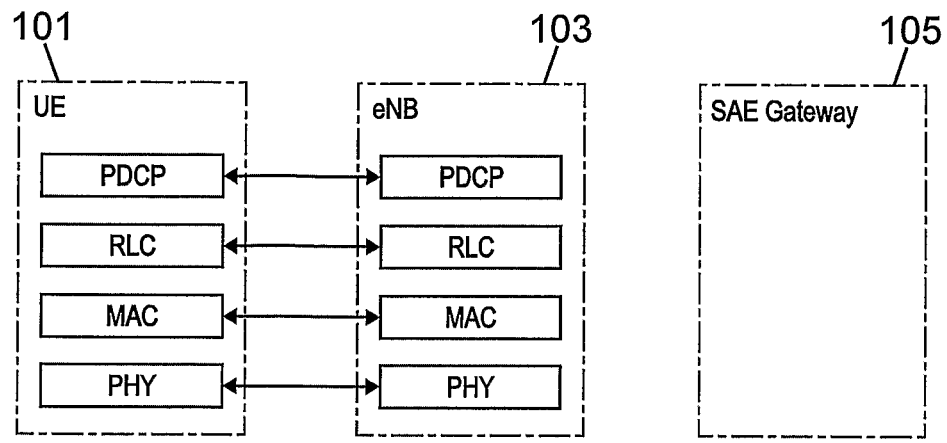
Figure 2C:
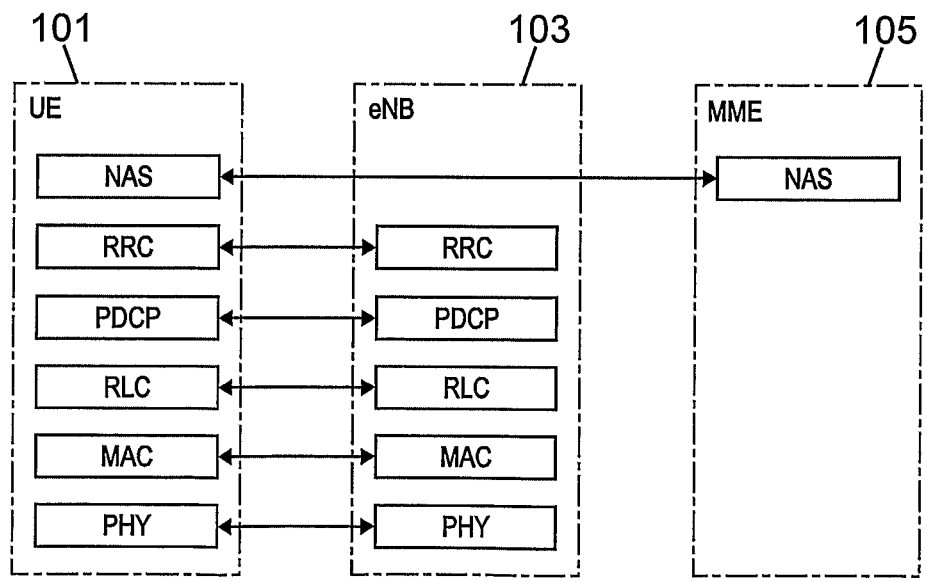

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:

a UE switches from power-off to power-on and needs to be registered to the network.

a UE is not time-synchronized with a eNodeB and starts transmitting data (for instance the user calls).

a eNodeB starts transmitting data to the UE but they are not synchronized (for instance the user receives a call).

a eNodeB measures a delay of the received signal from the UE (for instance the user is moving and has lost synchronization).

a UE is moving from one cell to another and needs to be time-synchronized with a different target eNodeB than the serving eNodeB it is registered to (handover).

Figure 3:
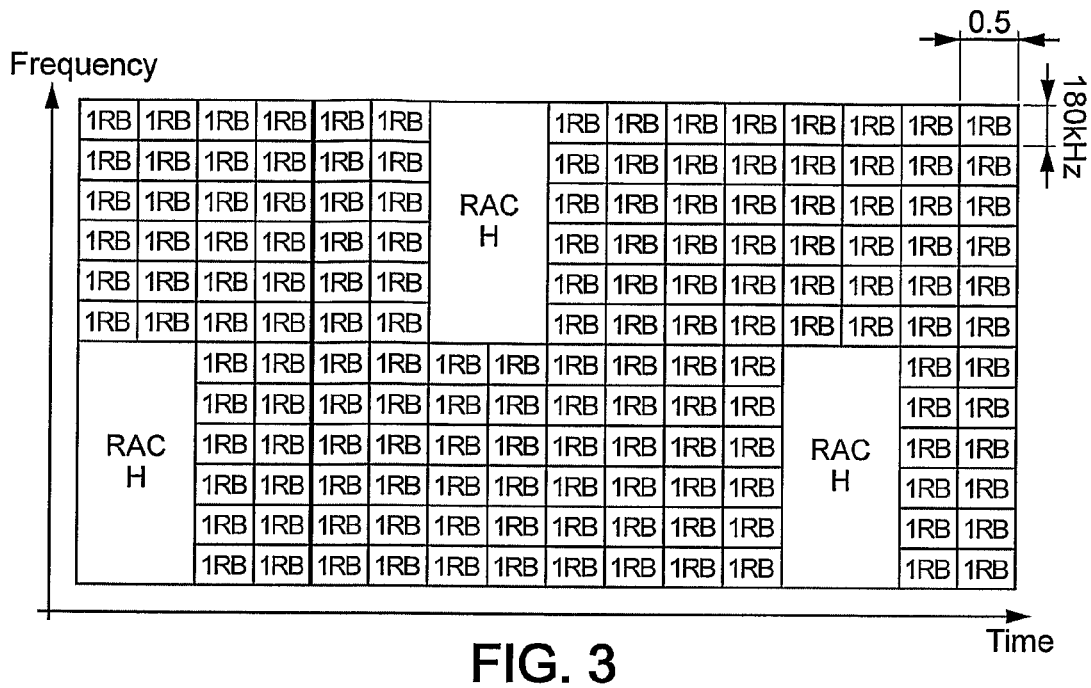

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

Figure 4:
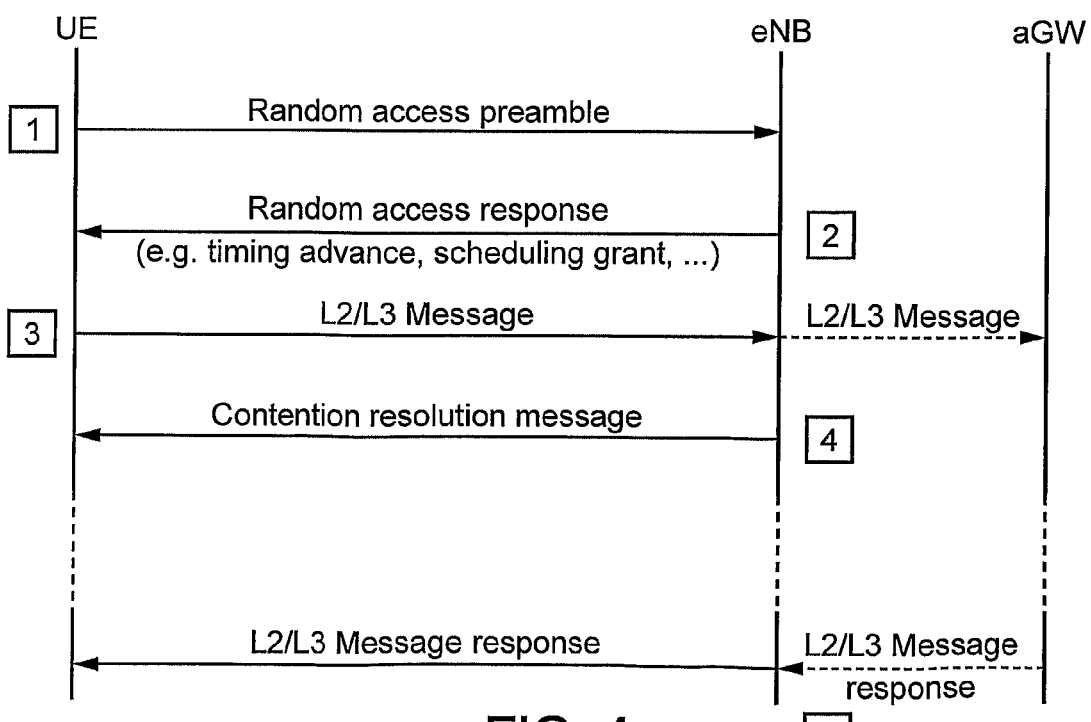

FIG. 4 illustrates an example of the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH). The received information includes the available preamble signatures in the cell, the location and period of RACH time slots; From the received information the UE 101 selects a preamble signature, a RACH time slot and a frequency band.

The preamble signature is chosen by the UE 101 from among a set of preamble signatures known by the eNB 103. The UE 101 generates a single random access burst containing the chosen preamble signature and transmits it to the eNB 103 over the selected time slot at the selected frequency in message 1.

Figure 5:
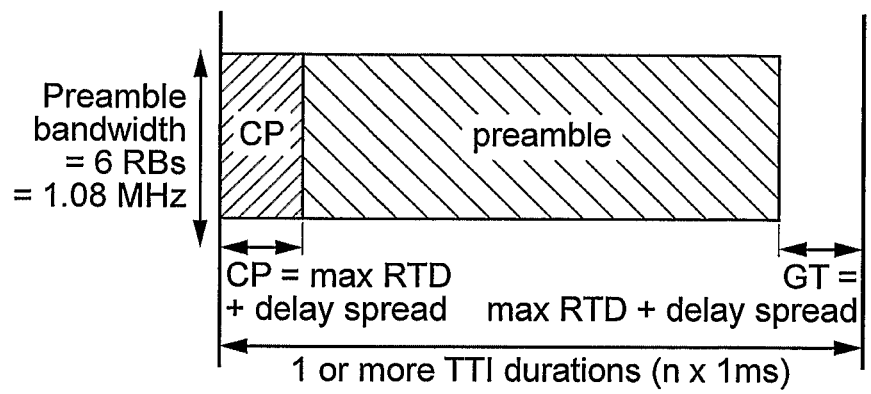

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

Preamble signatures should portray good autocorrelation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

The Zadoff-Chu Zero Correlation Zone (ZC-ZCZ) sequences are used to fulfil these requirements. Each cell possesses a set of 64 signatures obtained from ZC-ZCZ sequences. The length of one sequence is N=839 samples. A ZC-ZCZ sequence is defined by two integers: u is the root index and v is the cyclic shift index.

In the time domain, the v-th cyclic shift is extracted from the u th root with:

$$x_{u,v}(n) = x_u(n+v \cdot N_{CS}) \ n=0 \ldots N-1$$

where $N_{CS}$ is the cyclic shift length.

The u-th root sequence in the frequency domain is given by:

$$x_u(n) = e^{i\pi \cdot u \cdot \frac{n(n+1)}{N}}$$

The ZC-ZCZ sequences are used because they can generate a large number of sequences and they offer interesting correlation properties: the autocorrelation function shows no side peaks. The cross correlation between two sequences obtained from different roots is $\sqrt{N}$. Thus ZC sequences have zero-cross-correlation zones.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

In LTE-A (Long Term Evolution—Advanced) the employment of carrier aggregation where two or more component carriers has been considered in order to provide increased transmission bandwidth and to support spectrum aggregation. The LTE-A system supports transmission bandwidths of up to 100 MHz. Carrier aggregation between uplink (UL) and downlink (DL) bandwidth can be either symmetric or asymmetric. In the case of symmetric carrier aggregation (e.g. 2UL component carriers and 2DL component carriers) if 2UL component carriers have different PRACH configurations, the processing complexity of an eNB can increase by a factor of 2. In the case of asymmetric carrier aggregation as, illustrated in FIG. 6, (e.g. 2 CCs in DL and 1 CC in UL) there is an ambiguity issue to solve, since an eNB has no knowledge as to which downlink component carrier a UE is camped on in order to send a random access response to the UE. As a result it may send a response on both downlink component carriers. This ambiguity can impact an eNB's behaviour in the rest of the random access procedure and result in resource waste.

SUMMARY OF THE INVENTION

According to a first aspect of the present invention there is provided a method of configuration of random access resources in the case of carrier aggregation wherein one or more uplink and downlink component carriers can be configured by the network, the method comprising: allocating, by each of a plurality of downlink component carriers, a respective PRACH configuration for at least one corresponding uplink component carrier; allocating, by each downlink component carrier a respective PRACH frequency position, for the at least one corresponding uplink component carrier; assigning, by each downlink component carrier, a respective resource access pattern, for the at least one corresponding uplink component carrier wherein the resource access pattern defines a time pattern of available PRACH resources in a radio frame; and transmitting the allocated PRACH configuration, the allocated PRACH frequency position, and the assigned resource access pattern on the corresponding downlink component carrier. In embodiments of the invention, the same PRACH configuration and/or the same PRACH frequency position may be allocated for the uplink component carriers by the plurality of downlink component carriers.

The solution proposed by the invention is applicable to either symmetric or asymmetric carrier aggregation, i.e. it constitutes an agnostic solution. Since the same PRACH configuration can be allocated to all UL component carriers the processing complexity is minimized and can remain at the same level of complexity as for LTE Rel8. The PRACH validity/access pattern allocated to each UL component carrier helps to solve the ambiguity issue that exists in an asymmetric case by exploiting random access opportunities.

According to a second aspect of the present invention there is provided a method of random access transmission, the method comprising receiving a PRACH configuration on a downlink component carrier; receiving a PRACH frequency position to the downlink component carrier; receiving a resource access pattern on the downlink component carrier wherein the resource access pattern defines a time pattern of available PRACH resources in a radio frame; selecting an available PRACH resource according to the resource access pattern; and transmitting a RACH preamble on the selected PRACH resource.

According to a third aspect of the invention there is provided a user equipment comprising: a transceiver for receiving a PRACH configuration on a downlink component carrier; receiving a PRACH frequency position on the downlink component carrier; receiving a resource access pattern on the downlink component carrier wherein the resource access pattern defines a time pattern of available PRACH resources in a radio frame; a selector for selecting an available PRACH resource according to the resource access pattern; wherein the transceiver is operable to transmit the RACH preamble on the selected PRACH resource.

According to a fourth aspect of the invention there is provided a network entity for configuring random access resources in the case of carrier aggregation wherein one or more uplink and downlink component carriers can be configured by the network, the network entity comprising: a PRACH configuration allocator for allocating, by each of a plurality of downlink carriers, a PRACH configuration for at least one corresponding uplink component carrier; a PRACH frequency position allocator for allocating, by each of a plurality of downlink component carriers, a PRACH frequency position for the corresponding uplink component carrier; a resource access pattern assignor for assigning, by each downlink component carrier, a respective resource access pattern for each corresponding uplink component carrier wherein the resource access pattern defines a time pattern of available uplink PRACH resources in a radio frame; and a transceiver for transmitting the allocated PRACH configuration, the allocated PRACH frequency position, and the assigned resource access pattern on the corresponding downlink component carrier.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:—

FIG. 1 is a block diagram illustrating network structure of an E-UTRA system.

FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

Figure 6:
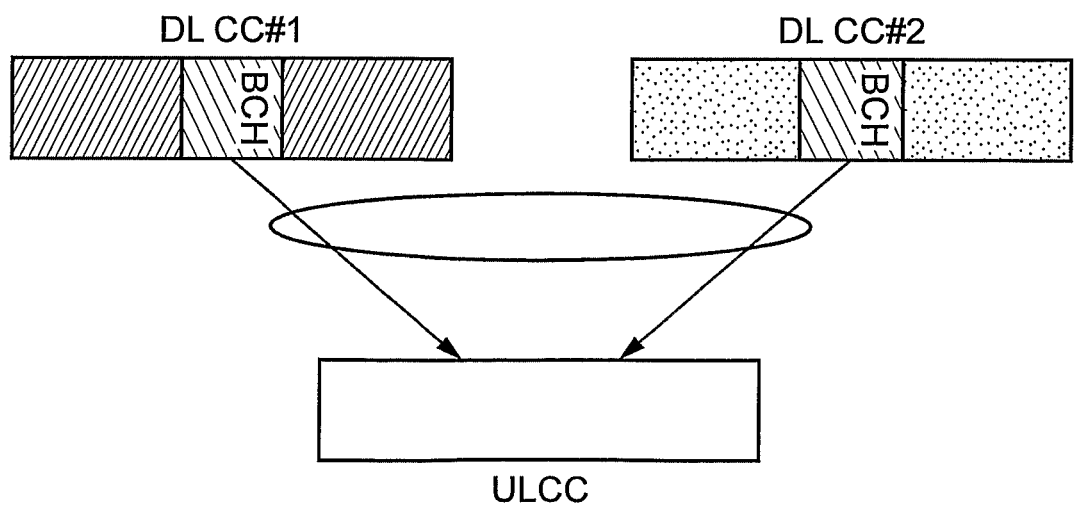
Figure 7:
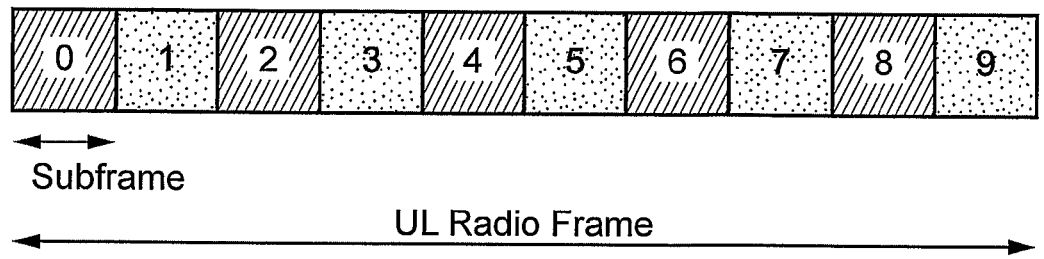
Figure 8A:
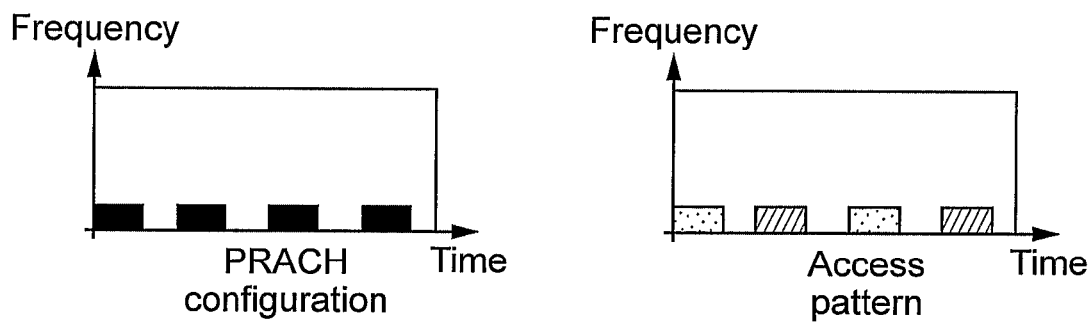
Figure 8B:
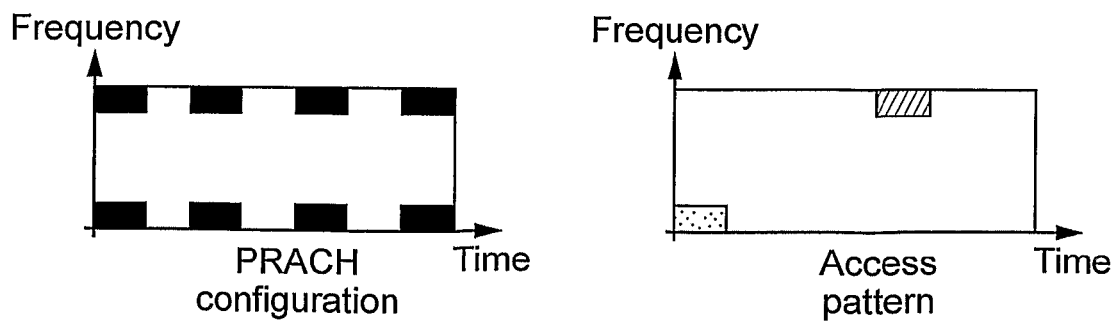
Figure 9:
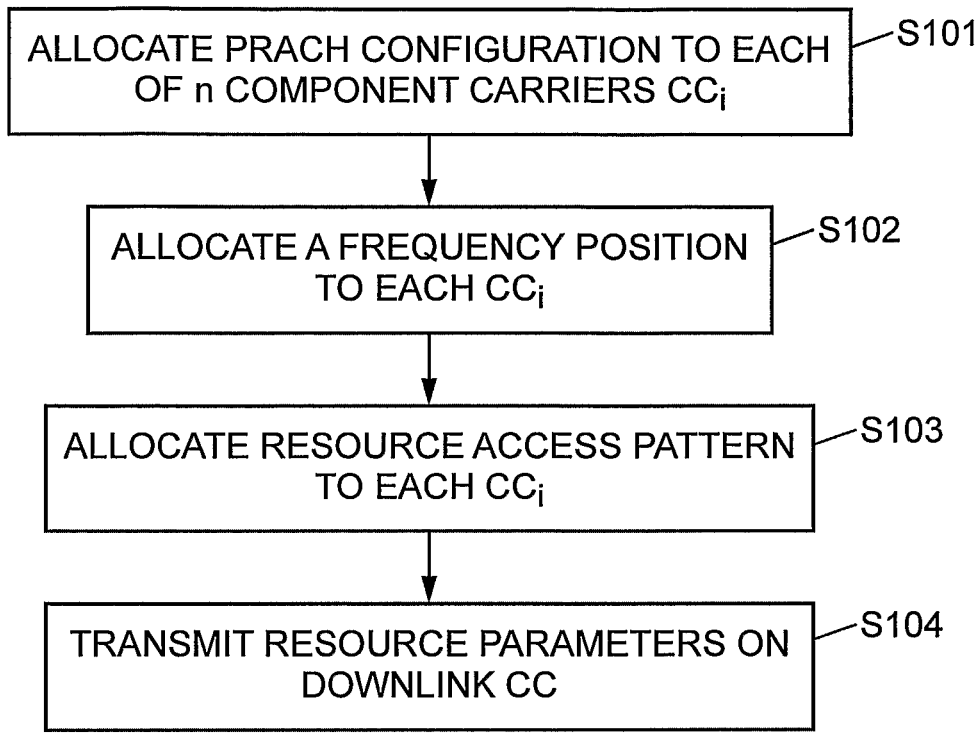
Figure 10:
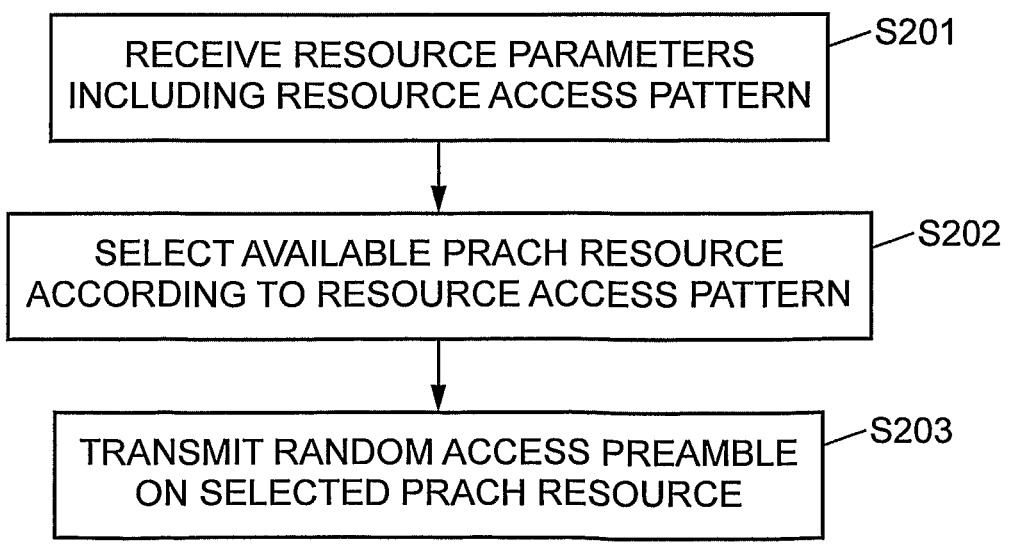

FIG. 3 graphically illustrates an example of the location of RACH slots in a 2.5 MHz bandwidth FIG. 4 is a diagram illustrating a typical RACH procedure FIG. 5 schematically illustrates a RACH preamble structure in E-UTRA FIG. 6 is a schematic diagram of an example of asymmetric carrier aggregation FIG. 7 is a graphical illustration of an example of an uplink PRACH configuration and a time validity pattern allocated by a first downlink component carrier and a second downlink component carrier according to an embodiment of the invention FIG. 8A is an example of an uplink component carrier configuration with common frequency position being signaled by a first downlink component carrier and a second downlink component carrier according to an embodiment of the invention FIG. 8B is an example of a uplink component carrier configuration with different frequency positions being signaled by a first downlink component carrier and a second downlink component carrier according to another embodiment of the invention FIG. 9 is a flow chart of steps of a method of allocating random access resources according to an embodiment of the invention FIG. 10 is a flow chart of steps of a method of random access preamble transmission according to an embodiment of the invention

DESCRIPTION OF PREFERRED EMBODIMENTS

Reference will now be made in detail to embodiments of the present invention, examples of which are illustrated in the accompanying drawings.

Embodiments of the present invention are directed to a RACH initial access procedure between a UE and an eNodeB.

The transmission of a PRACH, is restricted to certain time and frequency resources. These resources are enumerated in increasing order of the subframe number within the radio frame and the physical resource blocks in the frequency domain such that index 0 corresponds to the lowest numbered physical resource block and subframe within the radio frame. PRACH resources within the radio frame are indicated by a PRACH Resource Index, where the indexing is shown in Table 1.

The parameter PRACH-Configuration-Index is given by higher layers, indicating the available PRACH resources per subframe with PRACH opportunities of 1, 2, 5, 10, and 20 ms. The parameter PRACH-FrequencyOffset given by higher layers indicates PRACH resources available in the frequency domain.

TABLE 1 frame structure type 1 random access configuration for preamble format 0-3 [TS.36.211]

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

In a first embodiment of the invention the proposed solution introduces a transmission of a time/frequency pattern by each downlink component carrier $CC_i$ of n component carriers and avoids uplink (UL) overload by each downlink component carrier transmitting the same PRACH configuration index. For example as illustrated in FIG. 7 odd numbered uplink PRACH opportunities in the time domain are assigned by a first downlink component carrier CC#1 and even numbered uplink PRACH opportunities are assigned by a second downlink component carrier CC#2. Moreover in other embodiments any specific uplink PRACH opportunities may be allocated by a specific downlink component carrier or all uplink PRACH opportunities may be allocated by one downlink component carrier $CC_i$.

FIG. 9 illustrates a random access procedure in LTE-A between a user equipment UE 101 and a base station eNodeB 103 according to at least one embodiment of the present invention.

In step S101 a PRACH configuration index is assigned by each downlink component carrier CC1 to $CC_n$ of n downlink carriers $CC_i$. In the first embodiment of the invention the same PRACH configuration is assigned by each downlink component carrier $CC_i$.

In step S102 a PRACH frequency position is assigned by each downlink component carrier $CC_i$. In the first embodiment of the invention the same PRACH frequency is allocated by each downlink carrier for example as illustrated in FIG. 8A where a common frequency position but a different timing pattern is allocated by CC1 and CC2

In alternative embodiments of the invention different PRACH frequency positions may be allocated by each downlink component carrier $CC_i$ as illustrated in FIG. 8B.

In step S103 a resource access pattern is assigned by each downlink component carrier $CC_i$ wherein the resource access pattern defines a time pattern of uplink available PRACH resources within a radio frame. The resources access pattern can define at least one time sub-frame occurrence of an available PRACH resource corresponding to the allocated PRACH configuration or define even or odd sub frame occurrences of available PRACH resources corresponding to the PRACH configuration.

Depending on the possible cases of time/frequency pattern assignment signaled by each of the downlink component carriers $CC_i$ a validity pattern code could be used to specify to indicate the assigned uplink time/frequency pattern. The validity pattern can be independent of the PRACH configuration that is used. For example 2 bits could indicate the configuration depicted in FIG. 7 as presented in table 2:

TABLE 2

Example of a validity pattern independent of PRACH configuration.

| Validity pattern | PRACH occasion |
|---|---|
| 00 | Each PRACH opportunity |
| 01 | Every even PRACH opportunity |
| 10 | Every odd PRACH opportunity |
| 11 | Reserved |

Alternatively, the interpretation of the validity pattern could depend on the PRACH configuration. For example, for PRACH configuration index 10 (PRACH in subframes 2, 5 and 8, see Table 1), a possible configuration is presented in Table 3:

TABLE 3

Example of validity pattern dependant on PRACH configuration.

| Validity pattern | PRACH occasion |
|---|---|
| 00 | Each PRACH opportunity |
| 01 | Each subframe 2 |
| 10 | Each subframe 5 |
| 11 | Each subframe 8 |

In alternative embodiments of the invention a combination and/or aggregation of the examples given in Tables 2 and 3 can be envisaged in order to cover all possible PRACH configurations as shown in Table 4

TABLE 4

Example of validity pattern dependant of PRACH configuration.

| Configuration | Validity pattern | Validity pattern |
|---|---|---|
| 0 | 0000 | All |
| 1 | 0001 | Each subframe 0 |
| 2 | 0010 | Each subframe 1 |
| 3 | 0011 | Each subframe 2 |
| 4 | 0100 | Each subframe 3 |

TABLE 4-continued

Example of validity pattern dependant of PRACH configuration.

| Configuration | Validity pattern | Validity pattern |
|---|---|---|
| 5 | 0101 | Each subframe 4 |
| 6 | 0110 | Each subframe 5 |
| 7 | 0111 | Each subframe 6 |
| 8 | 1000 | Each subframe 7 |
| 9 | 1001 | Each subframe 8 |
| 10 | 1010 | Each subframe 9 |
| 11 | 1011 | Every even PRACH opportunity |
| 12 | 1100 | Every odd PRACH opportunity |
| 13 | 1101 | Reserved |
| 14 | 1110 | Reserved |
| 15 | 1111 | Reserved |

A way of allocating the time/frequency validity pattern may be implemented in embodiments of the invention as follows:

Each downlink component carrier $CC_i$ is assigned and the potential PRACH occasions restrictions due to the signaled validity pattern are considered for the determination of the next PRACH occasion.

To allow this, a different validity pattern is signaled by the network within broadcasting information elements of each downlink $CC_i$ The validity pattern signaled is mapped to the corresponding PRACH index.

The PRACH resources are ordered according to their occurrence in time and frequency.

The PRACH occasions can be ordered in a way that they are addressable by a validity pattern that indicates at which occasions a PRACH can be applied, i.e. every 1st, every 2nd and so on.

In step S104 the PRACH configuration, PRACH frequency position allocation and resource access pattern are transmitted by the enodeB on the corresponding downlink component carrier.

With reference to FIG. 10 in step S201 a UE receives on a downlink component carrier the PRACH configuration, the PRACH frequency position and the resource access pattern. In step S202 the UE selects an available PRACH resource according to the received resource pattern. In step S203 the UE transmits a preamble to the eNode on the selected PRACH resource.

Thus in embodiments of the invention the proposed solution introduces a transmission of the time/frequency pattern by each downlink $CC_i$ avoiding the UL overload since the same PRACH configuration index may be used by each downlink component carrier $CC_i$. By this, there is the possibility to assign either all even or all odd uplink PRACH opportunities in the time domain by one downlink component carrier $CC_i$. Moreover any specific PRACH opportunities or all opportunities may be allocated by one downlink component carrier $CC_i$ Which pattern to use (validity/access pattern) is broadcasted in the PBCH of each component carrier by the eNB. The same PRACH configuration can be broadcast by each component carrier $CC_i$ and that the access opportunity is provided by the validity/access pattern that should be different for each component carrier $CC_i$.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of random access resources at a network for carrier aggregation, wherein one or more uplink and downlink component carriers can be configured by the network, the method comprising:

allocating, by each of a plurality of downlink component carriers, a Physical Random Access Channel configuration for at least one corresponding uplink component carrier, wherein the Physical Random Access Channel configuration indicates a preamble format and at least one available subframe number within a radio frame;

allocating, by each downlink component carrier, a Physical Random Access Channel frequency position for the at least one corresponding uplink component carrier;

assigning, by each downlink component carrier, a resource access pattern for each corresponding uplink component carrier, wherein the resource access pattern defines a time pattern of the at least one available subframe number indicated by the Physical Random Access Channel configuration; and transmitting the allocated Physical Random Access Channel configuration, the allocated Physical Random Access Channel frequency position, and the assigned resource access pattern on the corresponding downlink component carrier to a user equipment, wherein a same Physical Random Access Channel configuration is allocated to be transmitted by each downlink component carrier, wherein the resource access pattern further defines at least one time sub-frame occurrence of the at least one available subframe number indicated by the Physical Random Access Channel configuration, wherein a different resource access pattern is assigned to be transmitted by each downlink component carrier, and wherein a different Physical Random Access Channel frequency position is allocated to be transmitted by each downlink component carrier to solve ambiguities resulting from a use of each of the plurality of downlink component carriers.

2. The method according to claim 1, wherein:

the resource access pattern further defines even or odd time sub-frame occurrences of the at least one available subframe number indicated by the Physical Random Access Channel configuration;

if the resource access pattern defines even occurrences, a Random Access Channel preamble is transmitted on an even time sub-frame occurrence of the at least one available subframe number indicated by the Physical Random Access Channel configuration; and if the resource access pattern defines odd occurrences, the Random Access Channel preamble is transmitted on an odd time sub-frame occurrence of the at least one available subframe number indicated by the Physical Random Access Channel configuration.

3. A method of random access transmission at a user equipment, the method comprising:

receiving a Physical Random Access Channel configuration on one of a plurality of downlink component carriers, wherein the Physical Random Access Channel configuration indicates a preamble format and at least one available subframe number;

receiving a Physical Random Access Channel frequency position on each of the downlink component carriers;

receiving a resource access pattern on the one of the plurality of downlink component carriers, wherein the resource access pattern defines a time pattern of the at least one available subframe number indicated by the Physical Random Access Channel configuration;

selecting an available Physical Random Access Channel resource according to the resource access pattern; and transmitting a Random Access Channel preamble on the selected Physical Random Access Channel resource, wherein the resource access pattern further defines at least one time sub-frame occurrence of the at least one available subframe number indicated by the Physical Random Access Channel configuration, and wherein a different Physical Random Access Channel frequency position is allocated to be transmitted by each downlink component carrier to solve ambiguities resulting from a use of each of the plurality of downlink component carriers.

4. The method according to claim 3, wherein the resource access pattern defines even or odd time sub-frame occurrences of the at least one available subframe number indicated by the Physical Random Access Channel configuration;

if the resource access pattern defines even occurrences, a Random Access Channel preamble is transmitted on an even time sub-frame occurrence of the at least one available subframe number indicated by the Physical Random Access Channel configuration; and if the resource access pattern defines odd occurrences, a Random Access Channel preamble is transmitted on an odd time sub-frame occurrence of the at least one available subframe number indicated by the Physical Random Access Channel configuration.

5. A user equipment, comprising:

a transceiver for:

receiving a Physical Random Access Channel configuration on one of a plurality of downlink component carriers, wherein the Physical Random Access Channel configuration indicates a preamble format and at least one available subframe number within a radio frame;

receiving a Physical Random Access Channel frequency position on the one of the plurality of downlink component carriers; and receiving a resource access pattern on the downlink component carrier, wherein the resource access pattern defines a time pattern of the at least one available subframe number indicated by the Physical Random Access Channel configuration; and a selector for selecting an available Physical Random Access Channel resource according to the resource access pattern, wherein the transceiver is operable to transmit a random Access Channel preamble on the selected Physical Random Access Channel resource, wherein the resource access pattern further defines at least one time sub-frame occurrence of the at least one available subframe number indicated by the Physical Random Access Channel configuration, and wherein a different Physical Random Access Channel frequency position is allocated to be transmitted by each downlink component carrier to solve ambiguities resulting from a use of each of the plurality of downlink component carriers.

6. A network entity for configuring random access resources for carrier aggregation, wherein one or more uplink and downlink component carriers can be configured by the network, the network entity comprising:

a Physical Random Access Channel configuration allocator for allocating, by each of a plurality of downlink carriers, a Physical Random Access Channel configuration for at least one corresponding uplink component carrier, wherein the Physical Random Access Channel configuration indicates a preamble format and at least one available subframe number within a radio frame;
a Physical Random Access Channel frequency position allocator for allocating, by each of a plurality of downlink component carriers, a Physical Random Access Channel frequency position for the corresponding uplink component carrier;
a resource access pattern assignor for assigning, by each downlink component carrier, a resource access pattern for each corresponding uplink component carrier wherein the resource access pattern defines a time pattern of the at least one available subframe number indicated by the Physical Random Access Channel configuration; and
a transceiver for transmitting the allocated Physical Random Access Channel configuration, the allocated Physical Random Access Channel frequency position, and the assigned resource access pattern on the corresponding downlink component carrier to a user equipment,
wherein a same Physical Random Access Channel configuration is allocated to be transmitted by each downlink component carrier,
wherein resource access pattern r defines at least one time sub-frame occurrence of the at least one available sub-frame number indicated by the Physical Random Access Channel configuration,
wherein a different resource access pattern is assigned to be transmitted by each downlink component carrier, and
wherein a different Physical Random Access Channel frequency position is allocated to be transmitted by each downlink component carrier to solve ambiguities resulting from a use of each of the plurality of downlink component carriers.

* * * * *